May 11, 1926. 1,584,070
F. APPELQUIST
HEADLIGHT FOR MOTOR VEHICLES
Filed Oct. 4, 1924
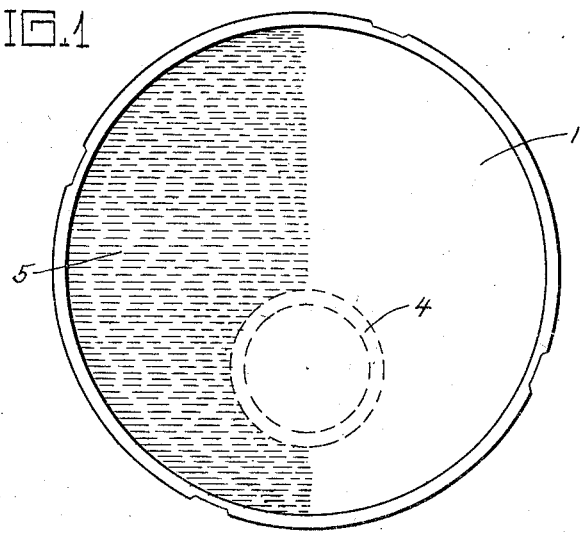
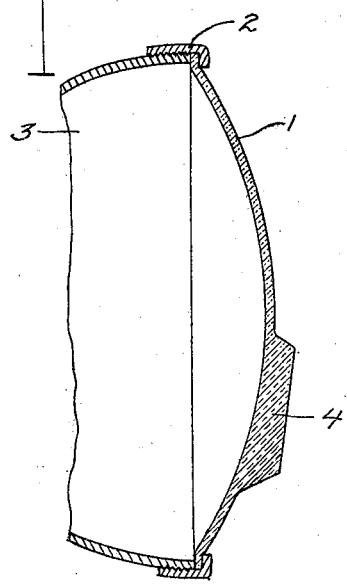 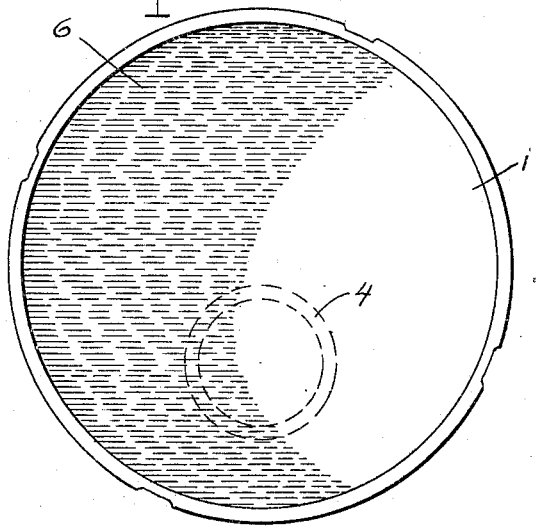
INVENTOR.
Frederick Appelquist,
BY Walter N. Haskell.
his ATTORNEY.

Patented May 11, 1926.

1,584,070

UNITED STATES PATENT OFFICE.

FREDERICK APPELQUIST, OF ROCK ISLAND, ILLINOIS.

HEADLIGHT FOR MOTOR VEHICLES.

Application filed October 4, 1924. Serial No. 741,603.

My invention has reference to head-lights for motor-vehicles, and has relation more specially to a novel form of lens for headlights combining a spot-light feature and a dimming arrangement. By means of the spot-light, or auxiliary lens, the rays of light from the lamp are concentrated and intensified so as to form a bright light in front of the vehicle, on the path thereof. In connection therewith the light from the headlight is shut off from that side of the road on which the traffic is in the opposite direction from that of the vehicle carrying the headlight.

In the drawings:—

Fig. 1 is an inner face view of a headlight lens embodying the invention.

Fig. 2 is a medial vertical section thereof.

Fig. 3 is a view similar to Fig. 1, showing a modified arrangement of the lens.

The reference number 1 indicates a concavo-convexo lens of usual form, adapted to be held in a rim 2 on the usual lamp casing, shown in part at 3. At a point below its center the lens is projected outwardly into a thickened portion, forming an auxiliary, or bull's-eye lens 4, of light focusing capacity, through which the rays of light from the head-light lamp are projected downwardly and forwardly to a point in the path of the machine. The lower portion of the lens 4 is thicker than the upper part, bringing the outer face of the lens into approximately a vertical position, resulting in the projection of the rays of light at some distance in front of the car.

As indicated at 5 in Fig. 1, the inner surface of the glass is shown provided with a translucent coating, as by a ground-glass formation, such coating extending over practically one half of the lens 1, and leaving the auxiliary lens 4 clear. This shaded portion of the lens is on the left-hand side thereof, looking forward, and as a result the path of a vehicle coming in the other direction is shaded from the light of the headlight, and the occupants of the approaching vehicle freed from any blinding glare therefrom. Both of the head-lights of the motor-vehicle are provided with a lens of this character, with a corresponding beneficial result from each. At the same time the track in front of the vehicle, and at the right-hand side thereof, is illuminated by the light passing through the unshaded portion of the lens 1. On the margin between the lighted portion and the shadow is the brilliant spot-light caused by the condensed rays passing through the lens 4.

In Fig. 3 is shown a modified form of the lens, in which the translucent portion is shown at 6, in the form of a crescent, and passing partially across the inner face of the lens 4. In this form the operation and results attained are the same as in the form hereinbefore set forth, and it will be obvious that variations may be made in the degree of shading of the lens, without departing from the scope of the invention.

What I claim, and desire to secure by Letters Patent, is:

In a head-light for motor vehicles, a concavo-convexo lens divided vertically into a transparent portion and a translucent portion, the latter portion dimming the headlight rays on that side of a highway along which vehicles are expected to approach, and an auxiliary lens of light focusing capacity, projected outwardly therefrom on the line between said transparent and translucent portions, at a point to direct the rays of light forwardly on the margin of light directed through said portions.

In testimony whereof I affix my signature.

FREDERICK APPELQUIST.